United States Patent [19]

Buckholz et al.

[11] Patent Number: 4,882,184

[45] Date of Patent: Nov. 21, 1989

[54] PROCESS FOR MICROWAVE BROWNING AND PRODUCT PRODUCED THEREBY

[75] Inventors: Lawrence Buckholz, Middletown; Brian Byrne, East Brunswick; Marion Sudol, Boonton, all of N.J.

[73] Assignee: International Flavors & Fragrances Inc., New York, N.Y.

[21] Appl. No.: 295,450

[22] Filed: Jan. 10, 1989

[51] Int. Cl.$^4$ .................. A21D 6/00; A23L 1/272
[52] U.S. Cl. .................... 426/243; 426/262; 426/305; 426/549
[58] Field of Search ............ 426/243, 262, 265, 305, 426/496, 549

[56] References Cited

U.S. PATENT DOCUMENTS

| | | | |
|---|---|---|---|
| 4,022,920 | 5/1977 | Doornbos et al. | 426/533 |
| 4,208,442 | 6/1980 | Evans et al. | 426/296 |
| 4,426,443 | 1/1984 | Shank | 430/538 |
| 4,448,791 | 5/1984 | Fulda et al. | 426/94 |
| 4,518,618 | 5/1985 | Hsia et al. | 426/262 |
| 4,588,600 | 5/1986 | Suderman | 426/555 |
| 4,721,623 | 1/1988 | Coffey et al. | 426/250 |
| 4,735,812 | 4/1988 | Bryson et al. | 426/262 |
| 4,764,390 | 8/1988 | Zukerman et al. | 426/438 |

FOREIGN PATENT DOCUMENTS 0284186 9/1988 European Pat. Off. ............ 426/262

*Primary Examiner*—George Yeung
*Attorney, Agent, or Firm*—Arthur L. Liberman

[57] ABSTRACT

Described is a process for carrying out microwave browning on baked goods and product produced thereby. The process comprises the step of providing:

(a) a composition of matter consisting essentially of precursors of a Maillard reaction product flavor, a solvent capable of raising the dielectric constant of the surface of a foodstuff to be cooked whereby the cooking time will be less than 120 seconds (such as propylene glycol or glycerine) and water;

(b) providing an uncooked baked goods foodstuff, e.g. dough;

(c) coating the composition of (a) onto the surface of the uncooked foodstuff; and (d) exposing the uncooked coated foodstuff with microwave radiation for a period of under 120 seconds whereby the resulting product is caused to be edible as a cooked foodstuff.

2 Claims, No Drawings

PROCESS FOR MICROWAVE BROWNING AND PRODUCT PRODUCED THEREBY

BACKGROUND OF THE INVENTION

The increased use of microwaves for cooking has given rise to a large market in microwavable foods. While the advantage of microwave cooking over convection oven cooking is the time savings, the disadvantage is that baked goods and meats do not develop the surface browning or crust formation expected with convection oven cooking.

Our objective has been to create that browning which enhances the products appearance, making it look as if it were cooked in a convection oven.

In the microwave, food does not have sufficient time or temperature for the chemicals responsible for browning to react. Therefore, for a microwave browning system to work, it must accelerate the rate of the browning reactions or locally increase the surface temperature. Ultimately, the reactions responsible for browning have to be accomplished in the relatively short time frame dictated by the foods preparation conditions. The times needed for preparing microwave foods vary depending upon the power output of the microwave unit and the mass of the food to be cooked. A typical 750 watt microwave will cook baked goods in 40 seconds to 4 minutes, while meat will take 6 to 15 minutes.

Several additional requirements for a successful microwave browning system are as follows:

1. in addition to the desired browning effect, it must generate either no aroma or one which is compatible with the target food.
2. the browning reaction must not take place before cooking the food.
3. after cooking, the browning must stop, and not darken substantially.

The reactions responsible for browning during convection oven cooking are the caramelization of sugars and the Maillard reaction between naturally occurring reducing sugars, amino acids, amines, peptides and proteins which results in the formation of colored melanoidins. Until recently (1984) there were numerous patent and literature references to such reactions for the production of flavors, where the generation of color was inconsequential or objectionable. In the past few years several patents have appeared wherein microwave browning created by Maillard reactions have been the topic.

Although the prior art does take advantage of the reaction between reducing sugars and amino acids, it has not made any correlation of reaction rates needed for browning reactions with reaction variables such a pH, solvent, or sugar reactivity.

THE INVENTION

Our invention has shown that the order of sugar reactivities observed for the typical thermally induced Amadori and Maillard reactions holds true in microwave cooking. As expected, pentoses were more reactive than hexoses and 6-deoxyhexoses more reactive than hexoses.

Unexpectedly, there is a strong relationship between pH and reactivity. At pH's in the range of 9-13, the browning reaction was accelerated relative to at acid pH's. Such a rate enhancement is attributed to the removal of a proton from the amino acid, leaving the amino group unprotonated and, therefore, more nucleophilic. The consequence of the latter is to accelerate the nucleophilic substitution of the amino group on the carbonyl of the reducing sugar. Since this reaction is the first step in the formation of color, it can be concluded that this is the rate determining step to melanoidins. In food applications, the pH is adjusted to a range of 9-13 by the addition of sodium bicarbonate, although any base would achieve the same effect.

Another unexpected finding is that the solvent in which the Maillard browning is run dramatically effects the rate of browning. Aprotic solvents, such as triacetin and vegetable oil, were useless in browning reaction systems since the reactants are not soluble in the solvent. Polar protic solvents are amongst the solvents in which the reactants are soluble; however, not all members of this solvent class are useful for microwave browning. Both water and ethanol are unacceptable as solvents since the rate of the browning reaction in these solvents is on the order of hours. In propylene glycol and glycerine the rate of browning is rapid, achieving the desired coloration in 40 seconds to 2 minutes (120 seconds).

The mechanism of solvent action is believed to be twofold. First, the ability of the solvent to solubilize the reactants is essential; however, that in itself is insufficient to qualify a solvent without the second property. The successful solvent has the ability to absorb microwave radiation (2450 MHz) and retain this absorbed energy as heat. Solvents with high heat capacities, high viscosities and low thermal conductivities are desirable, as they facilitate heat retention. With the above properties, the solvent effectively focuses part of the microwave radiation on the foods surface, locally raising the temperature and accelerating the browning reaction. Propylene glycol and glycerine are two materials which meet the necessary requirements as microwave browning solvents.

Examples of Maillard reaction products useful in the practice of our invention are as follows:

(a) reaction products of amino acids and sugars as described in U.S. Pat. No. 4,735,812 issued on Apr. 5, 1988, the specification of which is incorporated herein by reference;

(b) reaction product of a monosaccharide and/or a disaccharide and an amino acid as described in U.S. Pat. No. 4,547,377 issued on Oct. 15, 1985, the specification of which is incorporated by reference herein;

(c) Amadori products as described in Chem. Abstracts, Volume 109: 169074g as set forth below:

109: 169074g Studies of the Maillard reaction. Part 15. Derivatographic studies of the systems D-glucose/glycine, alanine, phenylalanine and the corresponding Amadori products. Westphal, G.; Oersi, F.; Kroh, L. (Sekt. Nahrungsguterwirtsch. Lebensmitteltechnol., Humboldt-Univ., Berlin, Ger. Dem. Rep.). Nahrung 1988, 32(2), 109-16 (Ger). From results of investigations of the D-glucose/DL-phenylalanine (1:1) model it was possible to classify under the chosen conditions the reaction into an earlier phase with a temp. of 130°, a developed phase at 130°-150° and the beginning of the final phase of the Maillard reaction at >150°, whereby insol. polymers were formed. The loss of carbohydrates and amino acids caused by thermal changes can be detd. by HPLC. A comparative study of the derivatograms of the 3 model systems (D-glucose with glycine, DL-alanine, and DL-phenylalanine) with their corresponding Amadori products shows the thermal instability of the Amadori compds. depended on the aglycon. The extremely small endothermal enthalpy values (DTA curves) of the reaction products supports this assumption. and (d) flavor compounds which are Amadori rearrangement compounds of 6-deoxy-aldohexoses such as rhamnose and alpha amino acids such as proline as described in detail in U.S. Pat. No. 4,022,920 issued on May 10, 1977, the specification of which is incorporated herein by reference.

The solvents useful in carrying out our invention have dielectric constants which cause the cooking via microwave radiation to take place in under 120 seconds (in the range of from about 40 seconds up to about 120 seconds).

The principles given above are illustrated in the following examples.

EXAMPLE I

Into 100 ml beakers were placed exactly 40.4 g of solvent. Each beaker was irradiated with 2450 MHz microwave radiation for 20 seconds, afterwhich the solvents temperature was measured. Experiments were run in triplicate. The results for several solvents are set forth in the following Table I.

TABLE I

| SOLVENT | TEMPERATURE (C.) |
| --- | --- |
| Propylene glycol | 91 |
| Glycerine | 88 |
| Ethanol | 78 |
| Water | 61 |

TABLE I-continued

| SOLVENT | TEMPERATURE (C.) |
| --- | --- |
| Triacetin | 80 |

EXAMPLE II

Blotters weighing 0.61 g were dosed with 0.10 g of test solutions. The test solution was placed on the center of the blotter. Blotters spotted in this manner were irradiated with 2450 MHz microwave (750 watts) radiation for various periods of time, starting at 20 seconds. The results of testing variables are summarized in Table II.

TABLE II

| EXAMPLE | Amino Acid | Amino Acid Wt. | Sugar | Sugar Wt. | Solvent | Solvent Wt. | pH | pH ADJ Agent | pH ADJ Agent Wt. | Microwave Time | Color Appearance | Aroma |
| --- | --- | --- | --- | --- | --- | --- | --- | --- | --- | --- | --- | --- |
| II-1 | Proline | 3.7 g | Rhamnose | 5.3 g | Ethanol | 16 g | 7–8 | NaHCO$_3$ | 2.7 g | 80 sec. | White | None |
| II-2 | Proline | 3.7 g | Rhamnose | 5.3 g | Ethanol Glycerine | 16 g 25 g | 7–8 | NaHCO$_3$ | 2.7 g | 40 sec. 20 sec. | Burnt Brown Golden Brown | Burnt Crusty Bready Sweet |
| II-3 | Proline | 3.7 g | Rhamnose | 5.3 g | Ethanol | 16 g | 6–7 | NaHCO$_3$ HOAc | 2.7 g 2.2 g | 40 sec. 80 sec. 120 sec. | White White White | None None None |
| II-4 | Proline | 3.7 g | Rhamnose | 5.3 g | Ethanol Glycerine | 16 g 25 g | 6–7 | NaHCO$_3$ HOAc | 2.7 g 2.2 g | 20 sec. | Golden Brown | Bready Sweet |
| II-5 | Proline | 3.7 g | Rhamnose | 5.3 g | Ethanol Glycerine | 16 g 50 g | 7–8 | NaHCO$_3$ | 2.7 g | 20 sec. | Golden Brown | Bready Sweet |
| II-6 | Proline | 3.7 g | Rhamnose | 5.3 g | Ethanol Glycerine | 16 g 75 g | 7–8 | NaHCO$_3$ | 2.7 g | 20 sec. | Dark Brown | Bready |
| II-7 | Proline | 3.7 g | Rhamnose | 5.3 g | Ethanol Glycerine | 16 g 175 g | 7–8 | NaHCO$_3$ | 2.7 g | 20 sec. | Golden Brown | Bready |
| II-8 | Proline | 3.5 g | Ribose | 4.5 g | Ethanol | 16 g | 7–8 | NaHCO$_3$ | 2.7 g | 80 sec. | White | None |
| II-9 | Proline | 3.5 g | Ribose | 4.5 g | Ethanol Glycerine | 16 g 25 g | 7–8 | NaHCO$_3$ | 2.7 g | 20 sec. | Dry Dark Brown | Burnt Bready |
| II-10 | Proline | 3.5 g | Ribose | 4.5 g | Ethanol Glycerine | 16 g 50 g | 7–8 | NaHOC$_3$ | 2.7 g | 20 sec. | Dark Brn. Golden | Sweet Bready |
| II-11 | Proline | 3.5 g | Ribose | 4.5 g | Ethanol Glycerine | 16 g 50 g | 6–7 | NaHCO$_3$ HOAc | 2.7 g 5.0 g | 20 sec. | Golden Brown | Sweet Bready |

What is claimed is:

1. A process for providing a cooked baked goods foodstuff comprising the steps of:
    (a) providing an uncooked baked goods composition having a continuous surface;
    (b) providing a mixture of:
        (i) proline;
        (ii) a sugar selected from the group consisting of rhamnose and ribose; and
        (iii) a solvent which is a mixture of glycerine and ethyl alcohol;
    wherein the mixture of ethyl alcohol and glycerine is in an amount sufficient to be capable of raising the dielectric constant of the surface of the foodstuff to be cooked whereby the foodstuff to be cooked is completely cooked in a period of time under 120 seconds;
    (c) coating the mixture of (b) onto the surface of the uncooked foodstuff provided in (a); and
    (d) exposing the thus coated uncooked foodstuff to microwave radiation for a period of time between 40 seconds and 120 seconds,
with the pH of the coating mixture being in the range of from about 9 up to about 13.

2. The product according to the process of claim 1.

* * * * *